(12) United States Patent
Boutros et al.

(10) Patent No.: US 10,250,493 B2
(45) Date of Patent: Apr. 2, 2019

(54) ASYMMETRIC NETWORK ELEMENTS SHARING AN ANYCAST ADDRESS

(71) Applicant: Nicira, Inc., Palo Alto, CA (US)

(72) Inventors: Sami Boutros, Union City, CA (US); Mani Kancherla, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 39 days.

(21) Appl. No.: 15/650,260

(22) Filed: Jul. 14, 2017

(65) Prior Publication Data

US 2019/0020579 A1 Jan. 17, 2019

(51) Int. Cl.
*H04L 12/717* (2013.01)
*G06F 9/50* (2006.01)
*H04L 12/761* (2013.01)
*H04L 29/12* (2006.01)

(52) U.S. Cl.
CPC ............ *H04L 45/42* (2013.01); *G06F 9/5077* (2013.01); *H04L 45/16* (2013.01); *H04L 61/6022* (2013.01); *H04L 61/6068* (2013.01)

(58) Field of Classification Search
None
See application file for complete search history.

(56) References Cited

U.S. PATENT DOCUMENTS

| | | | |
|---|---|---|---|
| 7,574,499 B1* | 8/2009 | Swildens | G06F 9/505 709/202 |
| 2008/0186968 A1* | 8/2008 | Farinacci | H04L 12/4633 370/392 |
| 2014/0310418 A1 | 10/2014 | Sorenson, et al. | |
| 2015/0063364 A1* | 3/2015 | Thakkar | H04L 12/66 370/401 |
| 2015/0271303 A1* | 9/2015 | Neginhal | H04L 69/22 370/392 |

* cited by examiner

*Primary Examiner* — Rebecca E Song
(74) *Attorney, Agent, or Firm* — Adeli LLP

(57) ABSTRACT

For a managed network implementing at least one logical router having centralized and distributed components, some embodiments provide a method that better supports the provision of certain network applications and/or services. The method receives at a host implementing (1) a distributed logical router and (2) a plurality of logical switches of a logical network along with other hosts, a message from a first data compute node (DCN) executing on the host. The host logically forwards the message to the distributed logical router that uses a particular anycast internet protocol (IP) address using a first media access control (MAC) address. The distributed router determines that the message requires processing by a centralized logical router (e.g., a service router, edge node, etc.) executing on an edge node host and forwards the message to the centralized logical router using the same anycast IP address and a second, unique MAC address.

20 Claims, 14 Drawing Sheets

ASYMMETRIC NETWORK ELEMENTS SHARING AN ANYCAST ADDRESS

BACKGROUND

Certain services provided by a router are expected to be provided using an internet protocol (IP) address associated with a same subnet as a data compute node (DCN) (e.g., virtual machine, container, namespace, etc.) for which it provides the service. If an IP address that is not in the subnet is used, a data message may be dropped as irrelevant by a switch or DCN expecting a data message from an IP address in the same subnet.

Additionally, services that use an IP address in a subnet used by a switch for which it is providing a service may malfunction if the router that is providing the service does not directly connect to the switch. For example, a source network address translation (SNAT) that uses an IP address in the subnet of the switch results in DCNs attempting resolve the IP address into a MAC address by sending, for example, an address resolution protocol (ARP) request over the switch. However, since the router that is the owner of the translated IP address is not connected to the switch it will never receive the ARP request and will be unable to respond.

Similar problems exist with a load balancing service for a set of server DCNs that are accessed by a client DCN on a same logical switch as the virtual IP (VIP) address of the set of server DCNs. In such a case, a client DCN that tries to resolve the VIP address will not be able to reach the router that is responsible for the VIP address because the router is not on the same switch.

BRIEF SUMMARY

For a managed network implementing at least one logical router having centralized and distributed components, some embodiments provide a method that better supports the provision of certain network applications and/or services. The method receives at a host implementing (1) a distributed logical router and (2) a plurality of logical switches of a logical network along with other hosts, a message from a first data compute node (DCN) executing on the host. The host logically forwards the message to the distributed logical router that uses a particular anycast internet protocol (IP) address using a first media access control (MAC) address. The distributed router determines that the message requires processing by a centralized logical router (e.g., a service router, edge node, etc.) executing on an edge node host and forwards the message to the centralized logical router that uses the same anycast IP address using a second, unique MAC address. In some embodiments, the logical forwarding takes place within a managed forwarding element (MFE) executing on a host machine as a logical operation. In some embodiments, the first MAC address is an anycast MAC address. The anycast MAC address in some embodiments is a virtual MAC address that is shared by multiple instances of a network element.

In some embodiments, the distributed router determines a logical switch over which to forward the message. A determination in some embodiments is made based on a policy-based routing policy. In some embodiments, the determination is made based on a host route configured on the distributed router. A data message in some embodiments is forwarded over one of (1) a logical switch on which the data message was received and (2) a logical switch implemented by the edge node host and other hosts that does not connect to DCNs.

In some embodiments, a message is received at a host implementing (1) a centralized logical router associated with an anycast internet protocol (IP) address and an anycast media access control (MAC) address and, along with other hosts (2) a plurality of logical switches of a logical network, and (3) a distributed logical router associated with the anycast IP address and anycast MAC address. The received message has a destination data compute node (DCN) connected to a particular logical switch in the plurality of logical switches. The host logically processes the message at the centralized logical router and logically forwards the message to the particular logical switch using the anycast media access control (MAC) address. The host then forwards the message to a host machine hosting the destination DCN to be delivered to the destination DCN over the particular logical switch. In some embodiments, logically processing the message at the centralized logical router includes logical routing and providing at least one network service (e.g., load balancing, network address translation, firewall, etc.).

A distributed router in some embodiments includes a set of routes for forwarding (e.g., routing) east-west traffic within the logical network. In some embodiments, a centralized logical router includes the same set of routes as the distributed routers as well as additional routes for forwarding north-south traffic into and out of the logical network. In some embodiments, the centralized logical routers connect to the same logical switches as the distributed routers. Logical switches in some embodiments further connect to DCNs (e.g., virtual machines, containers, etc.) that are destinations of logical network traffic.

In some embodiments, the centralized logical router provides a load balancing service. Providing a load balancing service in some embodiments includes sending healthcheck messages to the load balanced DCNs to ensure that all load-balanced DCNs are functioning properly. In order for the DCNs to receive these healthcheck messages from an expected IP address, the centralized logical router in some embodiments uses an anycast IP address associated with the subnet to which a load-balanced DCN connects (i.e., instead of an IP address used for a logical switch that connects the distributed router with the centralized logical router).

A centralized logical router in some embodiments performs source network address translation (SNAT). By having the centralized logical router directly connect to the logical switches, a translated IP address that is in the subnet of the logical switch is directly discoverable by DCNs connected to the logical switch. In some embodiments, SNAT is provided to ensure that load balancing services provided for a set of DCNs connected to a logical switch function correctly when they are accessed by other DCNs in the same logical switch using a virtual IP address that is in the subnet of the logical switch.

Centralized logical routers in some embodiments include active and standby centralized logical routers. In some embodiments, edge node hosts implementing the centralized logical routers also host DCNs. When a standby centralized logical router receives a data message requiring a network service from a DCN executing on the same host, the centralized logical router in some embodiments processes the data message as a distributed router and forwards the data message to the active centralized logical router for the centralized logical router to perform the service and forward the message to the destination.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 2:
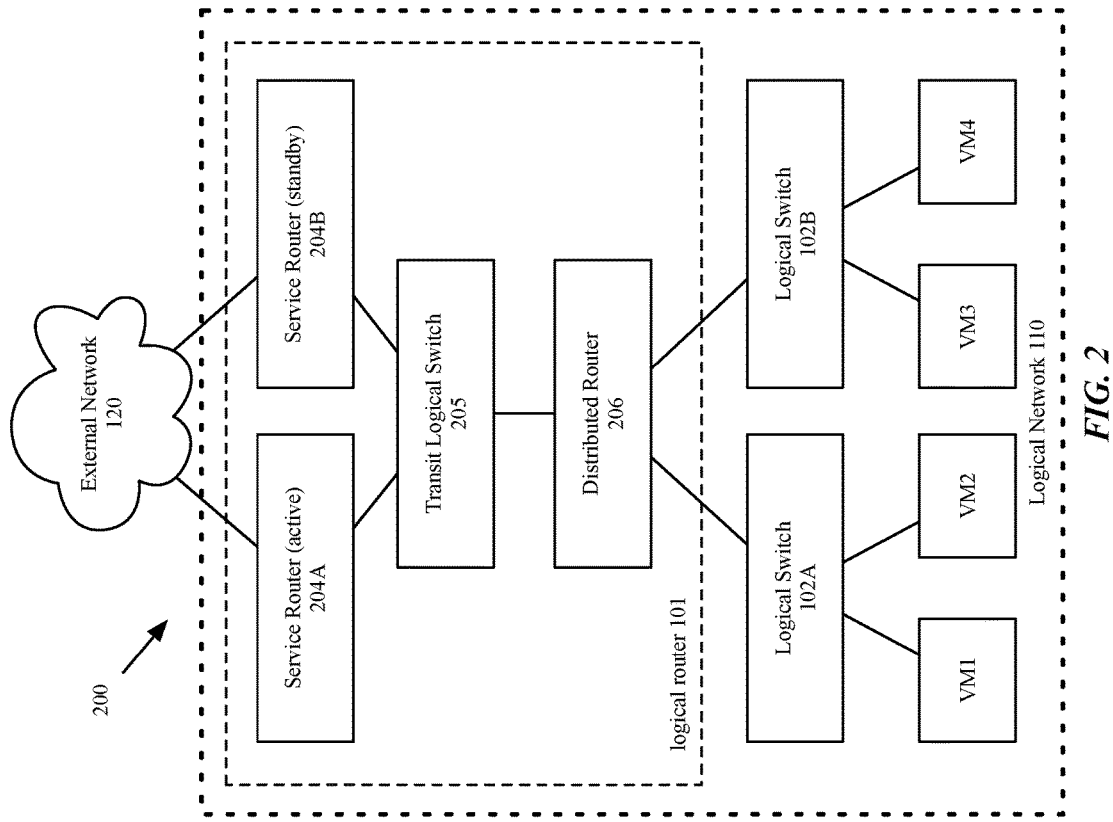
FIG. 2 conceptually illustrates an implementation of a logical router in a logical network.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For a managed network implementing at least one logical router having centralized and distributed components, some embodiments provide a method that better supports the provision of certain network applications and/or services. The method receives at a host implementing (1) a distributed logical router and (2) a plurality of logical switches of a logical network along with other hosts, a message from a first data compute node (DCN) executing on the host. The host logically forwards the message to the distributed logical router that uses a particular anycast internet protocol (IP) address using first media access control (MAC) address. The distributed router determines that the message requires processing by a centralized logical router (e.g., a service router, edge node, etc.) executing on an edge node host and forwards the message to the centralized logical router that uses the same anycast IP address using a second, unique MAC address. In some embodiments, the logical forwarding takes place within a managed forwarding element (MFE) executing on a host machine as a logical operation. In some embodiments, the first MAC address is an anycast MAC address. The anycast MAC address in some embodiments is a virtual MAC address that is shared by multiple instances of a network element.

As used in this document, the term message or data message refers to a collection of bits in a particular format sent across a network. It should be understood that the term message or data message may be used herein to refer to various formatted collections of bits that may be sent across a network, such as Ethernet frames, IP packets, TCP segments, UDP datagrams, etc. While the examples below refer to messages or data messages, it should be understood that the invention should not be limited to any specific format or type of data packet. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
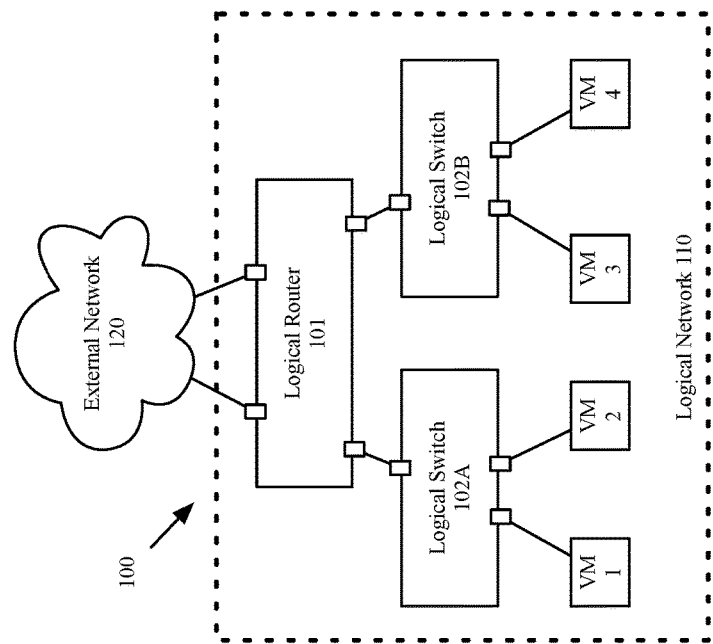
FIG. 1 conceptually illustrates an implementation of a logical router in a logical network.

FIG. 1 illustrates two different views of a user-defined logical network. A user-defined logical network as used in this application, refers to a particular logical abstraction of a network. In some embodiments, the logical abstraction includes logical counterparts to network elements of a physical network such as forwarding elements (e.g., switches, hubs, routers, bridges, etc.), load balancers, and firewalls. The logical forwarding elements (e.g., a logical switch or logical router) in some embodiments are implemented by a set of MFEs (e.g., physical or virtual/software switches, or routers) executing on host machines. A particular host machine may host data compute nodes (DCNs) (e.g., containers or virtual machines (VMs)) connected to multiple different logical networks and the set of MFEs implements all the logical networks to which the DCNs logically connect.

Configuration view 100 represents a logical network as designed by a user. As shown, the logical router 101 is part of a logical network 110 that includes the logical router 101 and two logical switches 102A and 102B. The two logical switches 102A and 102B each have VMs that connect to logical ports. While shown as VMs in these figures, it should be understood that other types of data compute nodes (e.g., containers, etc.) may connect to logical switches in some embodiments. The logical router 101 also includes two ports that connect to the external physical network 120. While shown with only one logical router, two logical switches, and four DCNs (VMs) in the logical network, a logical network may include any number of logical routers, switches, and DCNs. In some embodiments, logical router 101 may also be configured by a user to provide network services (e.g., load balancing, network address translation, etc.).

Logical routers (LRs) can be implemented in either a distributed manner (e.g., with the logical router processing performed in first-hop MFEs that physically couple directly to the data compute nodes) or a centralized manner (with the logical router processing performed in gateways for both north-south and east-west traffic). For centralized implementations, logical routers may be scaled out by using multiple physical boxes in order to provide additional throughput (e.g., using equal-cost multi-path (ECMP) techniques) as well as for failure protection.

In some embodiments, the logical routers may only use stateful services if implemented at least partially in a centralized (e.g., clustered) manner (to avoid the need for state-sharing between the logical router implementations). In different embodiments, these gateways (that provide centralized aspects of logical routers, as well as which form the connection to the external network for distributed LRs) may be implemented as virtual machines (sometimes referred to as Edge VMs), in other types of data compute nodes (e.g., containers), or by using the Linux-based datapath development kit (DPDK) packet processing software (e.g., as a VRF in the DPDK-based datapath).

In the management plane view 210 of the logical network, the logical switches 102A and 102B are the same, but the network controller has created two service routers (SRs) 204A and 204B, a distributed router 206 and a transit logical switch 205 for the logical router 101 depicted in user logical view 100. In some embodiments, these SRs operate in active-standby mode, with one of the SRs active and the other operating as a standby (in case of the failure of the active SR). The configuration of the northbound and southbound interfaces of the various router constructs 204A, 204B, and 206 and their connections with the transit logical switch 205 will be described in further detail below. In some embodiments, the management plane generates separate routing information bases (RIBs) for each of the router constructs 204A, 204B, and 206. That is, in addition to having separate objects created in the management/control plane, each of the router constructs 204A, 204B, and 206 is treated as a separate router with separate routes. The transit logical switch 205 then has logical ports for each of these routers, and each of the router constructs has an interface to the transit logical switch.

Figure 3:
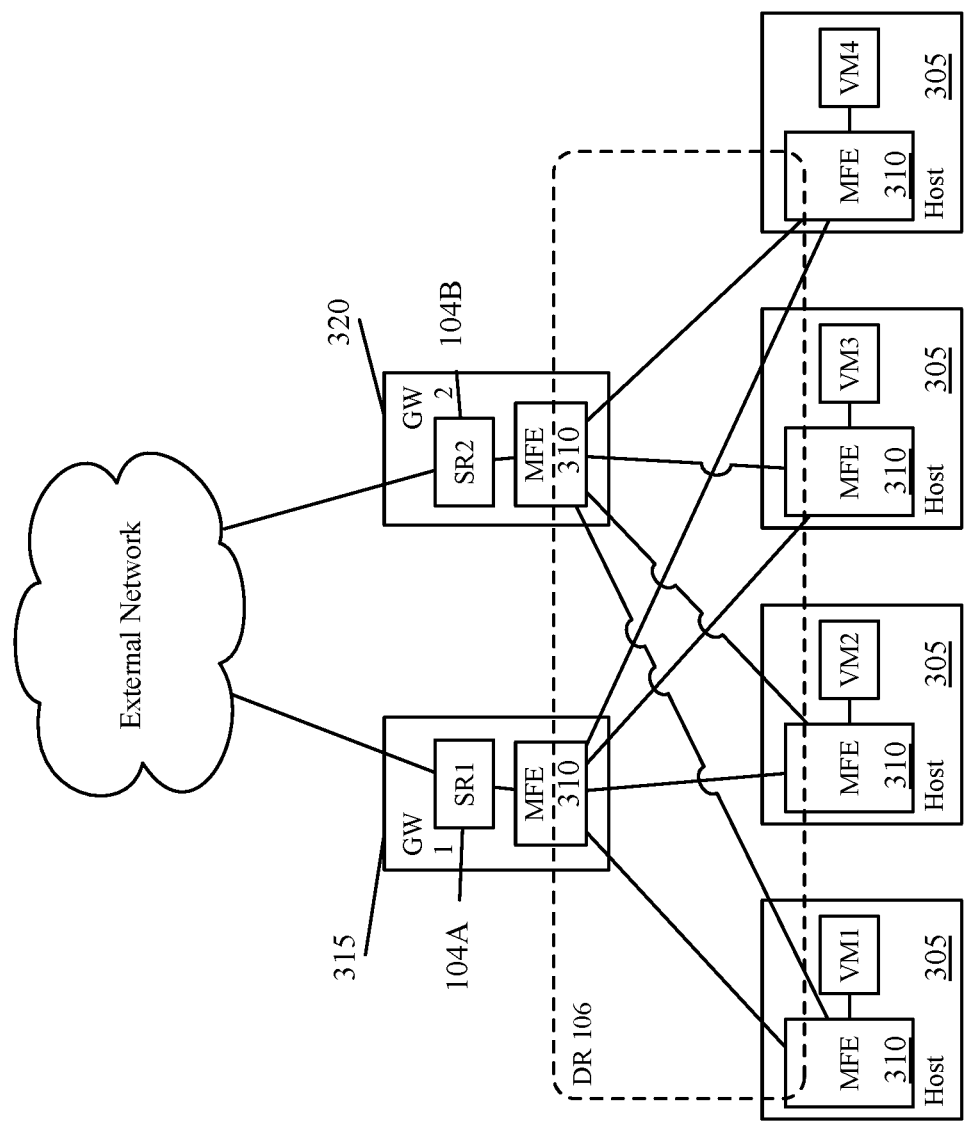
FIG. 3 conceptually illustrates an implementation of a logical network in a physical network.

FIG. 3 illustrates the physical distributed implementation of the logical network 110. Each of the VMs that couples to one of the logical switches 102A and 102B in the logical network 100 operates on a host machine 305. The MFEs 310 perform first-hop switching and routing for the logical switches 102A, 102B, and 205, and for the distributed logical router 206 (in addition to performing switching and/or routing for other logical networks). As shown in FIG. 3, the distributed router 206 is implemented across the MFEs 310 as well as gateways 315 and 320. That is, the datapaths (e.g., in the MFEs 310, in a similar MFE in the gateways 315 and 320 or in a different form factor on the gateways) all include the necessary processing pipelines for the DR 206 (and the transit logical switch 205). Each MFE is capable of performing (logical) L2 processing for each logical switch and (logical) L3 processing for distributed routers and tunneling a data message to another host machine on which a destination DCN in the logical network executes. Further details of the data message processing of some embodiments are described in United States Patent Publication 2016/0226754, which is hereby incorporated by reference.

Certain services that are provided by the service router 204 are expected to use an internet protocol (IP) address in a subnet used by a logical switch for which it is providing the service. However, in management view 200 a service router sending data messages into the logical network uses an IP address associated with the transit logical switch 205 and not one that is associated with either of the logical switches 102. In such cases a data message may be dropped as irrelevant by a switch or DCN expecting a data message from an IP address in the same subnet.

Additionally, services that use an IP address in a subnet used by a logical switch for which it is providing a service may malfunction if the service router that is providing the service does not directly connect to the logical switch. For example, a source network address translation (SNAT) that uses an IP address in the subnet of the logical switch results in DCNs in the subnet that need to resolve the IP address into a MAC address sending, for example, an address resolution protocol (ARP) request over the switch. However, since the service router that is the owner of the translated IP address is not connected to the logical switch it will never receive the ARP request and will be unable to respond.

Similar problems exist with a load balancing service for a set of server DCNs (e.g., virtual machines, containers, etc.) that are accessed by a client DCN on a same logical switch as the virtual IP (VIP) address of the set of servers. In such a case, a client DCN that tries to resolve the VIP address will not be able to reach the service router that is responsible for the VIP address because the service router is not on the same logical switch.

Figures 4, 5:
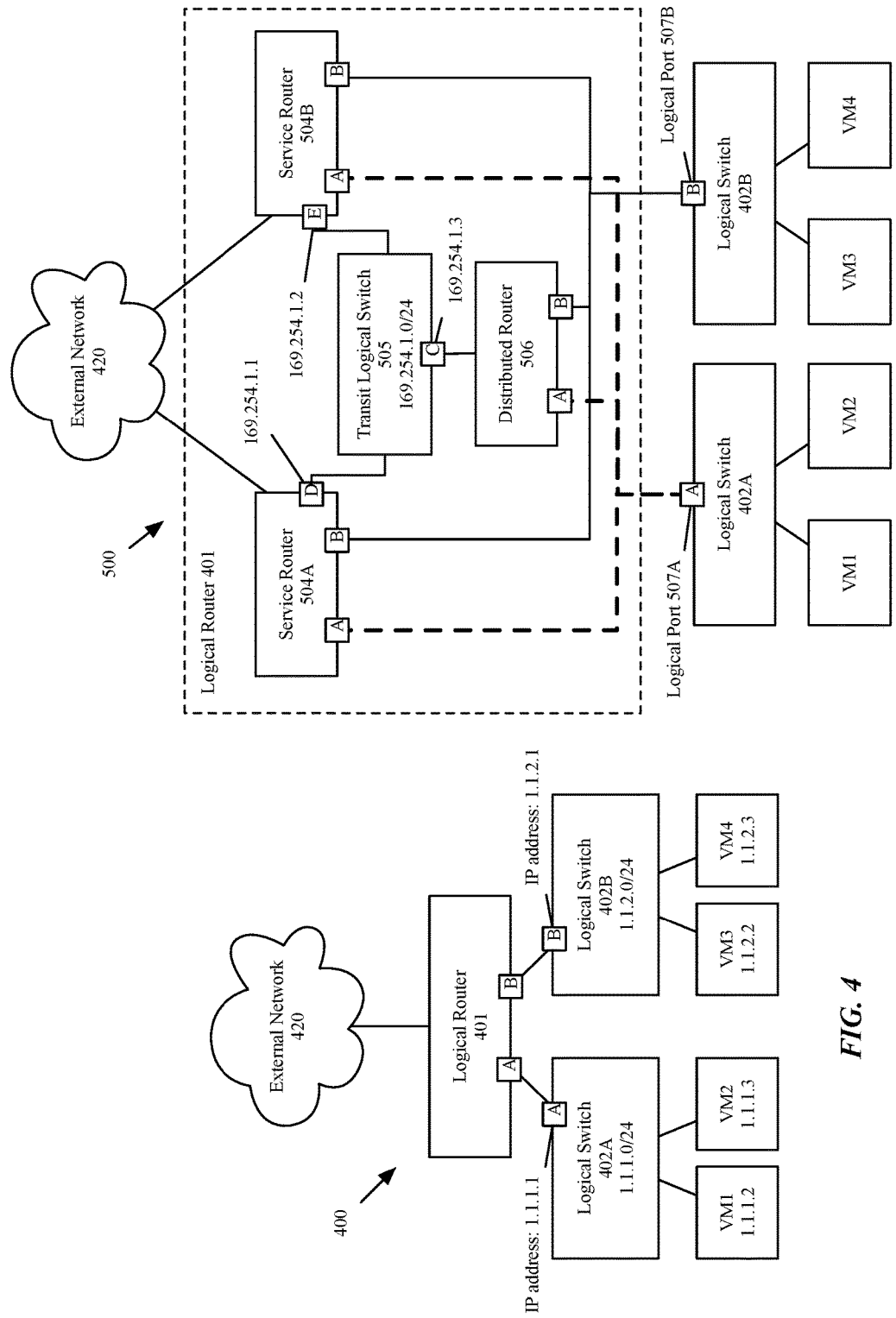
FIG. 4 conceptually illustrates an implementation of a logical router in a logical network.
FIG. 5 conceptually illustrates an implementation of a logical router in a logical network.

FIG. 4 conceptually illustrates a second implementation of a logical router in some embodiments. FIG. 4 illustrates configuration view 400 of a logical network. The user configuration view 400 indicates that a user has set up a logical network including a logical router 401, logical switches 402A and 402B and VM1-4 (a virtual machine being one example of a DCN in a logical network). Logical switch 402A is associated with IP subnet 1.1.1.0/24 and logical port 507A connected to the logical router has an IP address of 1.1.1.1. Logical switch 402B is associated with IP subnet 1.1.2.0/24 and logical port 507B connected to the logical router has an IP address of 1.1.2.1.

The network elements used to implement logical router 401 are shown in management plane view 500. As illustrated in FIG. 2, FIG. 5 illustrates a logical router 401 comprising two service routers 504, a transit logical switch 505, and a distributed router 506. Transit logical switch 505 is associated with subnet 169.254.1.0/24, and the logical port connected to the distributed router has an IP address of 169.254.1.3. The structure and function of a logical router implemented with a transit logical switch is described in United States Patent Publication 2016/0226754, which is hereby incorporated by reference.

In contrast to FIG. 2, FIG. 5 illustrates that the logical router 401 also includes direct logical connections between the service routers 504 and the logical switches 402. In some embodiments, a logical port 507A of logical switch 402A is associated with an IP anycast address (e.g., 1.1.1.1) that is shared by a logical port (labeled with the letter 'A') of each of the service routers 504 and distributed router 506. In some embodiments, a second logical port 507B of logical switch 402B is associated with an IP anycast address (e.g., 1.1.2.1) that is shared by a second logical port (labeled with the letter 'B') of each of the service routers 504 and distributed router 506. In some of these embodiments each of distributed router 506, service router 504A, and service router 504B have a separate MAC address that is reachable at logical ports 507A and B. While in these examples only two logical switches and ports are shown, a person of ordinary skill in the art will understand that the number of logical switches and associated logical ports is variable.

In some embodiments, service routers operate in an active-standby mode in which a first service router (e.g., 504A) acts as an active service router processing traffic directed to the service router while another service router (e.g., 504B) acts as a standby service router that does not process traffic directed to the service router, but will take over if the first service router fails. In other embodiments, service routers operate in active-active mode in which each service router actively processes traffic. In some embodiments, each logical switch has at least one active service router and at least one standby service router. In some of these embodiments, at least one particular service router acts as an active service router for one logical switch and a standby service router for another logical switch.

Figure 6:
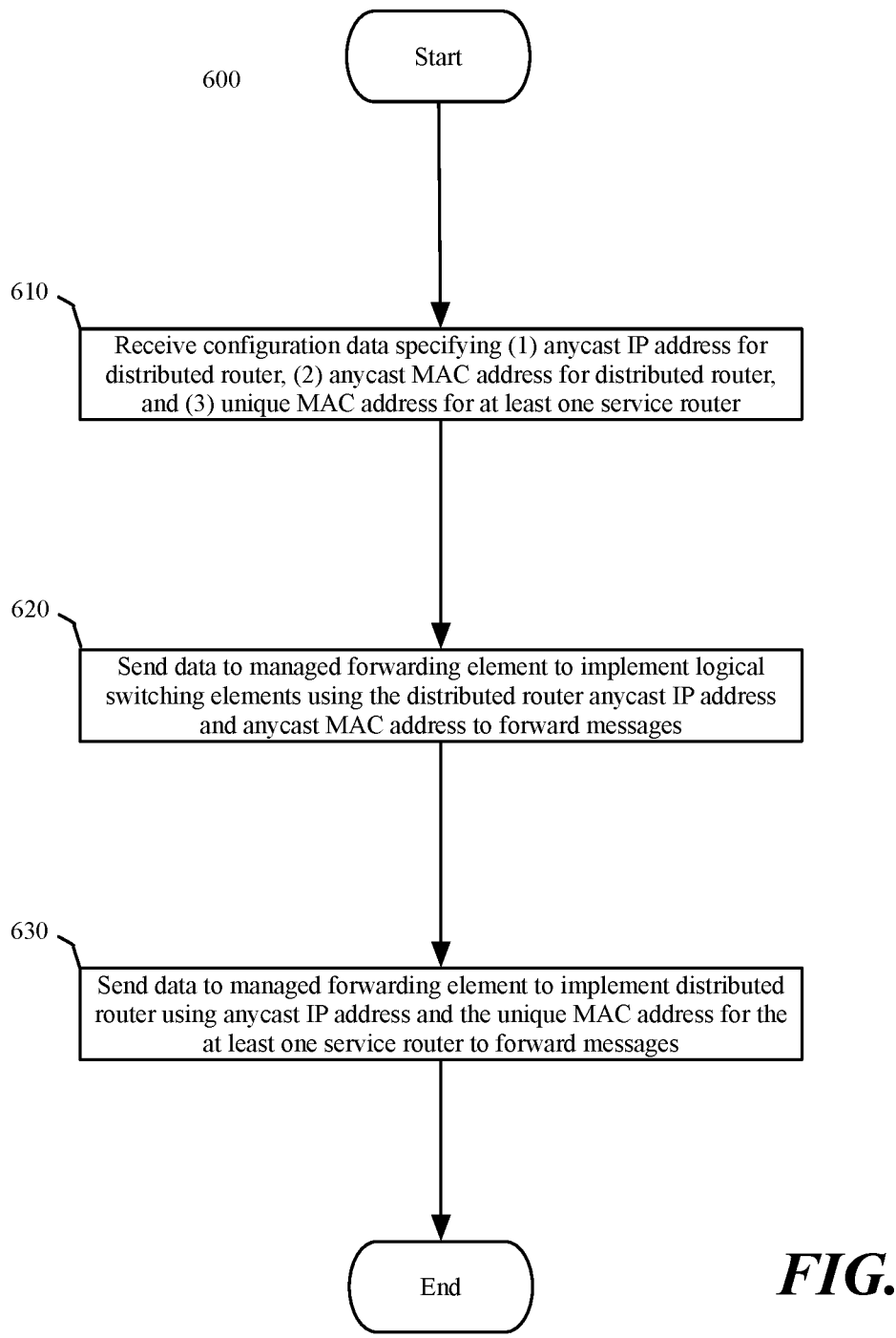
FIG. 6 conceptually illustrates a process of some embodiments for configuring host machines to use a MAC address of a centralized logical router to forward north-bound traffic from a logical network.

FIG. 6 conceptually illustrates a process of some embodiments for configuring a managed forwarding element (MFE) executing on a host machine to implement a logical router using an anycast IP address. In some embodiments, process 600 is performed by a local controller on a host machine to configure the MFE to implement logical processing of messages. The process starts (at 610) by receiving configuration data specifying (1) an anycast internet protocol (IP) address to be used to address a distributed router, (2) an anycast media access control (MAC) address used to address the distributed router, and (3) a unique MAC address for at least one service router. In some embodiments, the anycast MAC address of the distributed router is a shared virtual MAC address that is used to address each instance of a distributed router (e.g., distributed router 506) executing in an MFE. Multiple service routers providing north-south routing and/or other services each having their own unique MAC address are active in some embodiments. In those embodiments, the configuration data includes the unique MAC addresses for each of the multiple service routers. When multiple unique MAC addresses are provided, a distributed router selects a particular MAC address to use for a particular message or message flow using, for example, a load-balancing technique such as equal cost multi-path (ECMP) routing. In some embodiments, the configuration data is received from a central controller or central control plane. The configuration data in some embodiments also includes a set of routes that the distributed router uses to process east-west traffic within the logical network.

The process continues (at 620) by sending data based on the received configuration data to the MFE to implement at least one logical switching element that uses the anycast IP and MAC address of the distributed router to forward messages from DCNs (e.g., virtual machines, containers, etc.). In some embodiments, the data is sent as configuration data for the logical switching element. In some embodiments, the anycast IP address is configured as a default gateway for DCNs attached to the logical switch. In some embodiments, sending the data to the MFE includes sending data to configure the default gateway to be associated with the anycast MAC address of the distributed router. DCNs in some embodiments use an address resolution protocol to resolve the IP address of the default gateway into the anycast MAC of the distributed router.

The process then sends (at 630) data based on the received configuration data to the MFE to implement a distributed router that is addressed by the anycast IP address and the anycast MAC address and that uses the unique MAC for the at least one service router as a MAC address for a default gateway. Multiple unique MAC addresses are used in some embodiments in which multiple active service routers provide routing and/or other services for the logical network. The distributed router in these embodiments is configured to use all of the unique MAC addresses and to choose a specific MAC address to use for a particular message or message flow using, for example, a load balancing technique such as ECMP, hashing functions, etc. In some embodiments, the data is sent by the local controller as configuration data for the distributed router. Sending the data based on the received configuration data in some embodiments includes sending data to configure the distributed router with a set of routes for processing east-west traffic within the logical network. In some embodiments, an MFE executing on a same host machine as a service router is also configured with the set of routes for processing east-west traffic so as to be able to perform first hop processing at the MFE to direct traffic coming into the logical network to the destination in the logical network. The service router also learns additional routes for external destinations using, for example, address resolution protocol (ARP) requests or edge gateway protocols such as border gateway protocol (BGP).

Figure 7:
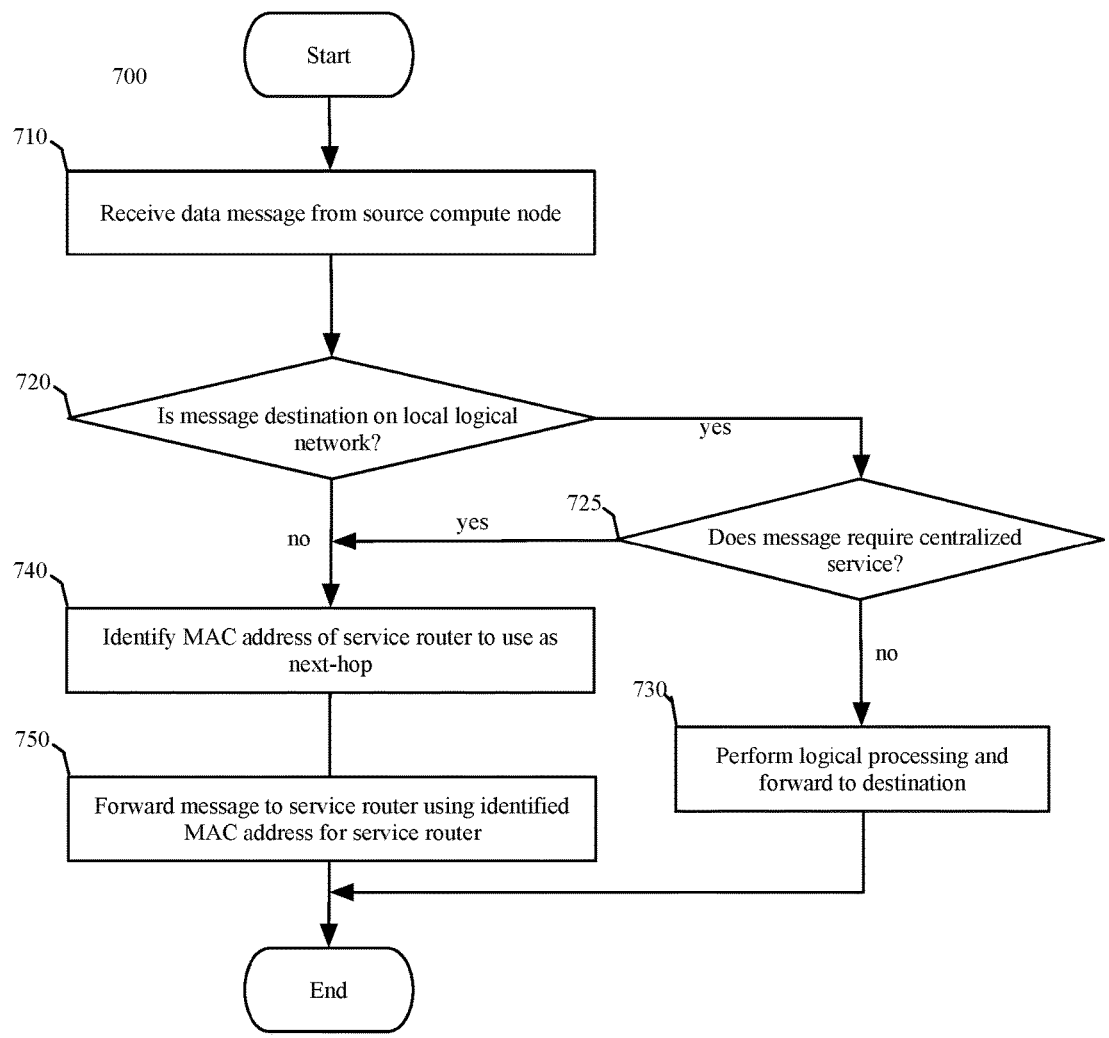
FIG. 7 conceptually illustrates a process of some embodiments for using a MAC address of a centralized logical router to forward north-bound traffic from a logical network.
Figure 8:
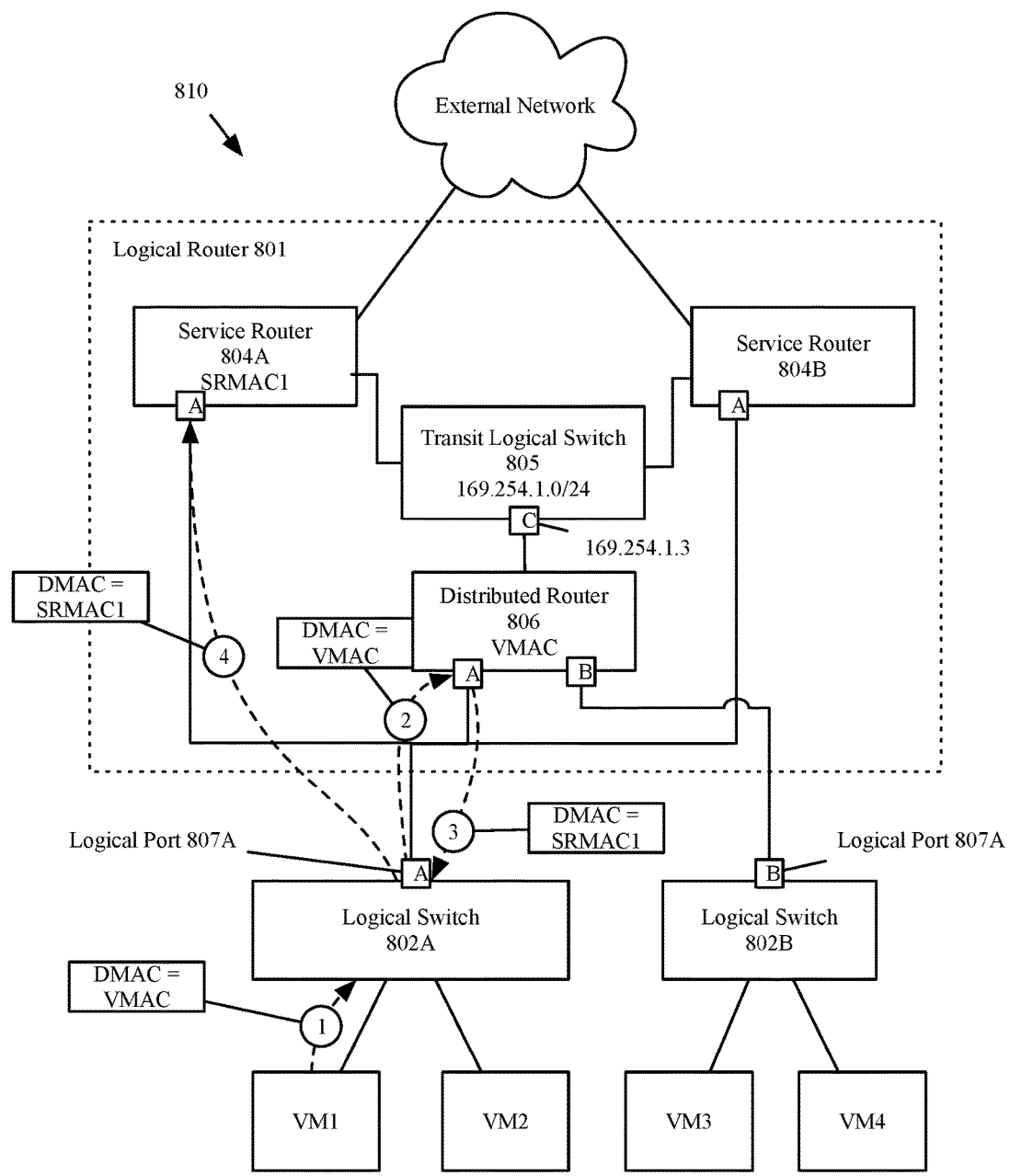
FIG. 8 conceptually illustrates a logical data message flow for data message traffic processed by a centralized logical router.
Figure 9:
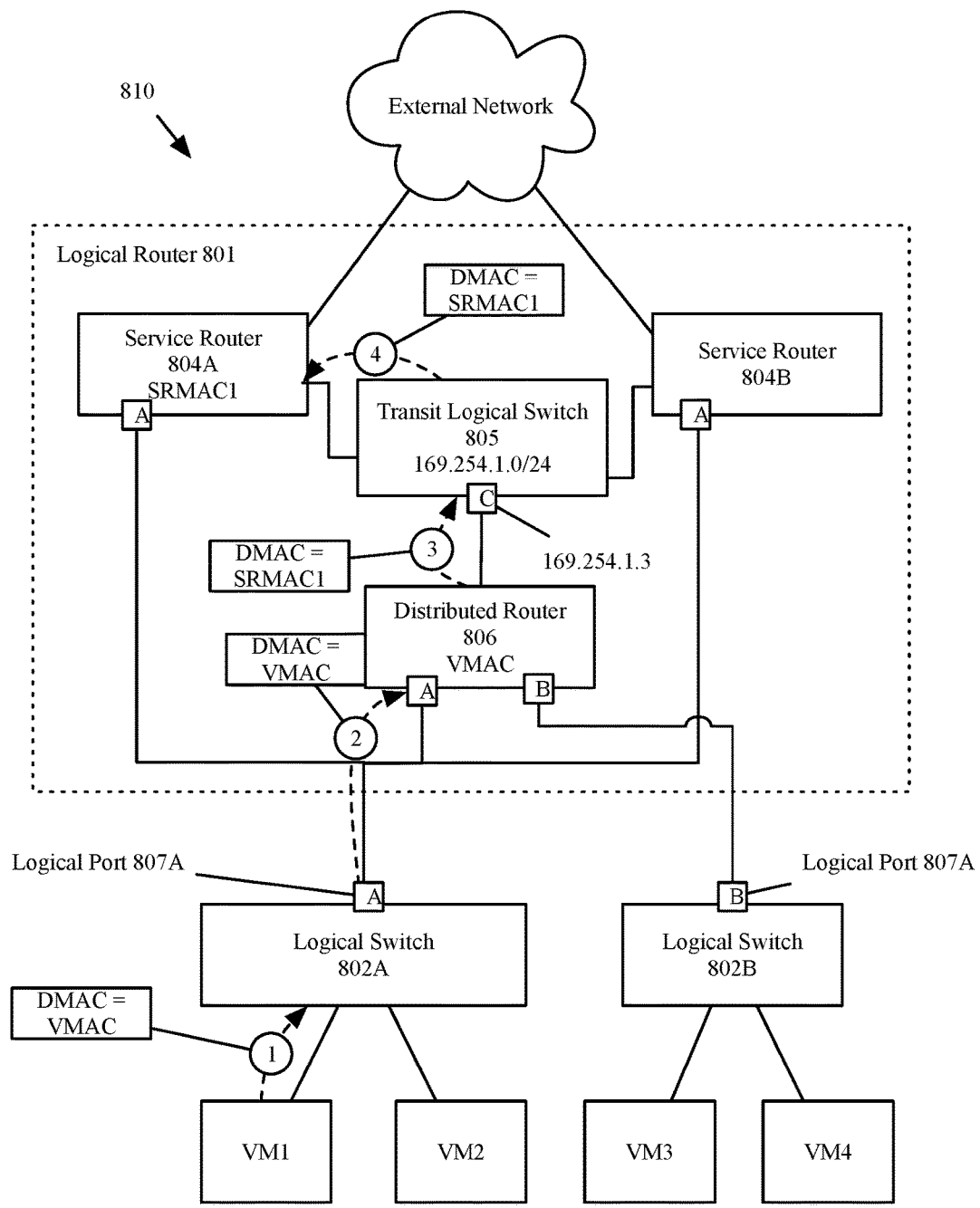
FIG. 9 conceptually illustrates a logical data message flow for data message traffic processed by a centralized logical router.

FIG. 7 conceptually illustrates a process 700 performed to forward data messages to a next-hop service router for routing to an external network. FIGS. 8 and 9 conceptually illustrate the logical processing in a management plane view 810 of the logical network. In some embodiments, the process 700 is performed by a managed forwarding element. The process starts (at 710) by receiving a data message from a source DCN on a particular logical switch. FIG. 8 depicts a data message being sent from VM1 to logical switch 802A (data message 1). The received message has a destination IP address that is in either the logical network or an external network.

The process then determines (at 720) if the message is destined for a DCN within the logical network. This determination is made in some embodiments to determine if the logical switch or the distributed router has the information necessary to forward the message directly to its destination. A destination IP address that is in a subnet of a logical switch of the logical network can be forwarded based on a set of routes used to configure the logical switch and the distributed router to process east-west traffic.

If the process determines (at 720) that the destination IP address is in the logical network the process determines (at 725) whether the message requires a service provided by the service router. If the message does not require a service provided by the service router, the process forwards the message to its destination (at 730). In some embodiments, forwarding the message to the destination includes a logical processing at the MFE that uses routes configured for the distributed router and information used to configure the logical switch. In some embodiments, a data message is logically processed by a logical switch (e.g., logical switch 802A) to logically forward the data message to the distributed router using the anycast (or virtual) mac address. The distributed router logically forwards the data message to the destination DCN over the logical switch connected to the destination DCN based on a configured route using the MAC address for the destination DCN and the process then ends.

In the physical system, a forwarded message in some embodiments is logically routed to the destination logical switch within an MFE executing the logical switches and distributed router and then encapsulated, e.g., using the destination logical switch identifier, to be tunneled to a host machine on which the destination DCN executes for the MFE of the host machine hosting the destination DCN to process and deliver to the destination DCN. In some embodiments, the processing at the destination DCN's host machine is done by the logical switch implemented by the managed forwarding element and connected to the destination DCN without any processing by the distributed router executing on the destination host machine.

If the process determines (at 720) that the destination IP address is not in the logical network or determines (at 725) that the message requires a service provided by the service router, the process then identifies (at 740) a MAC address of a next hop router. In some embodiments, the process identifies the MAC address of the next hop router based on a default gateway address associated with at least one service router. The default gateway is associated, in some embodiments, with multiple MAC addresses for multiple active service routers that were received during the configuration of the distributed router. In these embodiments, the process (at 740) identifies one of the multiple MAC addresses as the next hop router for the message using, for example, a load balancing process such as ECMP routing. In some embodiments, the default gateway address is the shared anycast IP address.

The process then forwards (at 750) the message to the service router associated with the identified MAC address for the service router to process and forward to the external network. In some embodiments, the message is sent over the logical switch from which it was received, while in others the message is sent over the transit logical switch. Different data messages may be sent over different switches depending on a policy based routing policy configured on the distributed router. A policy-based routing policy in some embodiments specifies a value in a header field of a data message or some other characteristic of the data message. In some embodiments, a distributed router is configured with a host route that directs all traffic with the anycast IP address as the destination IP address to the service router over the transit logical switch. The process then ends.

FIGS. 8 and 9 illustrate logical data message flows for data messages with a destination in an external network. In both FIGS. 8 and 9, data message 1 represents a data message with a destination in an external network or that requires the service provided by the service router. In some embodiments, data message 1 is addressed to a particular IP address that is not in the logical network and uses a destination MAC address for the distributed router (VMAC). Data message 2 represents the logical processing and forwarding of data message 1 by logical switch 802A. FIGS. 8 and 9 each depict one way a data message can be forwarded to service router 804A from distributed router 806. FIG. 8 depicts data message 3 being redirected to service router 804A over logical switch 802A on which the data message was received. The data message has its destination MAC address replaced with the unique MAC address of service router 802A (indicated by SRMAC1). In some embodiments, a loopback interface is used to return the data message to logical switch 802A. The logical switch executing in the MFE then forwards, as data message 4, the data message to the service router 804A using the service router's unique MAC address indicated by SRMAC1.

FIG. 9 depicts data message 3 being redirected to service router 804A over transit logical switch 805. The data message has its destination MAC address replaced with the unique MAC address of service router 802A (indicated by SRMAC1). The logical switch executing in the MFE then forwards, as data message 4, the data message to the service router 804A using the service router's unique MAC address indicated by SRMAC1. In some embodiments, the data message flows of FIGS. 8 and 9 are internal to the local MFE which performs the logical processing for all the logical switches and the distributed router. Data message 4 is sent to the gateway machine on which the service router executes. In some embodiments, data message 4 is sent using a tunnel connecting the host machine on which the source DCN executes and the gateway on which the service router executes. In some embodiments, the data message flows depicted in FIGS. 8 and 9 reflect the path of data message flows that require services provided by the service routers even if the data message flow originates and terminates within the logical network.

In some embodiments, a distributed router is configured to determine whether to forward a data message to a service router over the logical switch from which it was received or over the transit logical switch. In some embodiments, the determination is made using a policy-based routing policy. A policy-based routing policy in some embodiments specifies a value in a header field of a data message or some other characteristic of the data message. In some embodiments, a distributed router is configured with a host route that directs all traffic with the anycast IP address as the destination IP address to the service router over the transit logical switch.

In some embodiments, DCNs execute on edge hosts. Data messages from a DCN executing on an edge host hosting a standby service router are processed, in some embodiments, as described in FIGS. 8 and 9. In some embodiments, a DCN executing on an edge host hosting an active service router that sends a data message requires routing is logically processed directly by the service router without prior logical processing by the distributed router. For example, when a DCN executing on an edge host hosting an active service router sends a data message to a DCN executing on a different logical switch in the logical network, an MFE executing on the edge host performs the logical processing and forwards directly to the service router. The service router then performs any services and logically forwards the data message directly to the destination DCN over the destination logical switch using routes configured in the service router.

In some embodiments, a message is received at a host implementing (1) a centralized logical router associated with an anycast internet protocol (IP) address and an anycast media access control (MAC) address and, along with other hosts (2) a plurality of logical switches of a logical network, and (3) a distributed logical router associated with the anycast IP address and anycast MAC address. The received message has a destination data compute node (DCN) connected to a particular logical switch in the plurality of logical switches. The host logically processes the message at the centralized logical router and logically forwards the message to the particular logical switch using the anycast media access control (MAC) address. The host then forwards the message to a host machine hosting the destination DCN to be delivered to the destination DCN over the particular logical switch. In some embodiments, logically processing the message at the centralized logical router includes logical routing and providing at least one network service (e.g., load balancing, network address translation, firewall, etc.).

Figure 10:
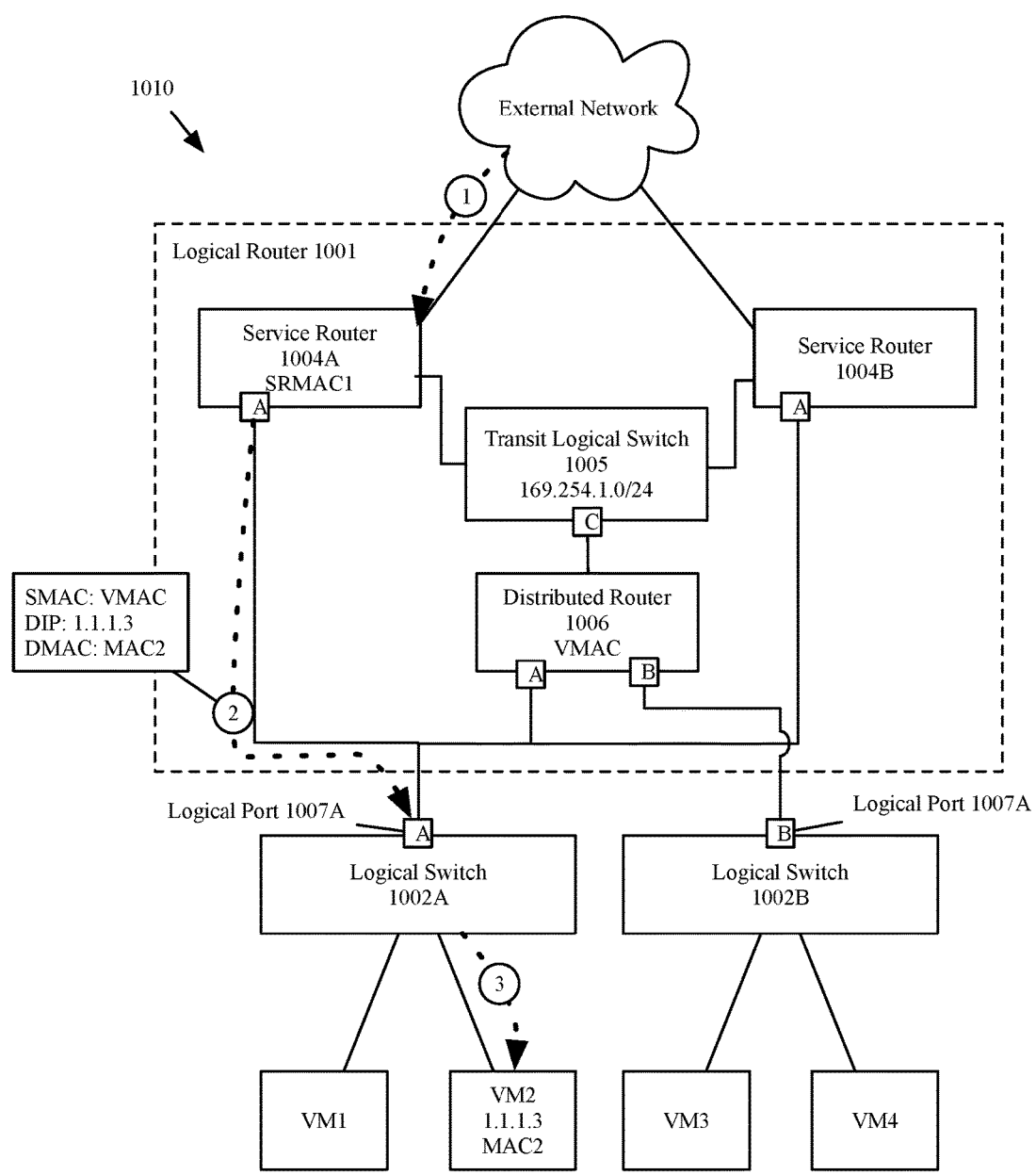
FIG. 10 conceptually illustrates a logical data message flow for north-south data message traffic.

FIG. 10 conceptually illustrates the logical data flow of a data message entering the logical network from the external network. In data message 1, a data message destined for VM2 is received from the external network at service router 1004A. The pairing of the source IP address and the source MAC address is learned. In some embodiments, this learned route is added to a set of routes that the service router is aware of that a distributed router is not aware of. In some embodiments, the implementation of the distributed router on the edge device also learns the pairing of the IP and MAC address from the externally sourced data message.

Service router 1004A then performs (not shown) any edge services required by the message. In some embodiments, the edge services are a set of edge services including any one or more of a firewall service, load balancing service, and a network address translation service. In some embodiments, a load balancing service includes a network address translation service as well to change a destination IP address from a virtual IP address associated with a set of DCNs (e.g., servers) that provide a service, to a destination IP address associated with a particular DCN (e.g., server).

After providing the necessary services, service router 1004A performs logical routing for the data message to direct the message to the appropriate destination DCN in the logical network. Because service router 1004A is directly connected to logical switch 1002A it can send the data message with the destination MAC address of the destination DCN without having to logically forward the data message to the distributed router via the transit logical switch as shown for data messages 2 and 3 in FIG. 10. As shown in FIG. 10, the source MAC address is identified as the anycast (virtual) MAC address shared by the distributed and service routers.

In some embodiments, the service router uses the anycast IP and MAC addresses to establish a bidirectional forwarding detection (BFD) session with DCNs providing a virtualized network function (VNF). The service router in some embodiments interacts with the DCNs using a border gateway protocol (BGP) or open shortest path first (OSPF) routing protocol.

Figure 11:
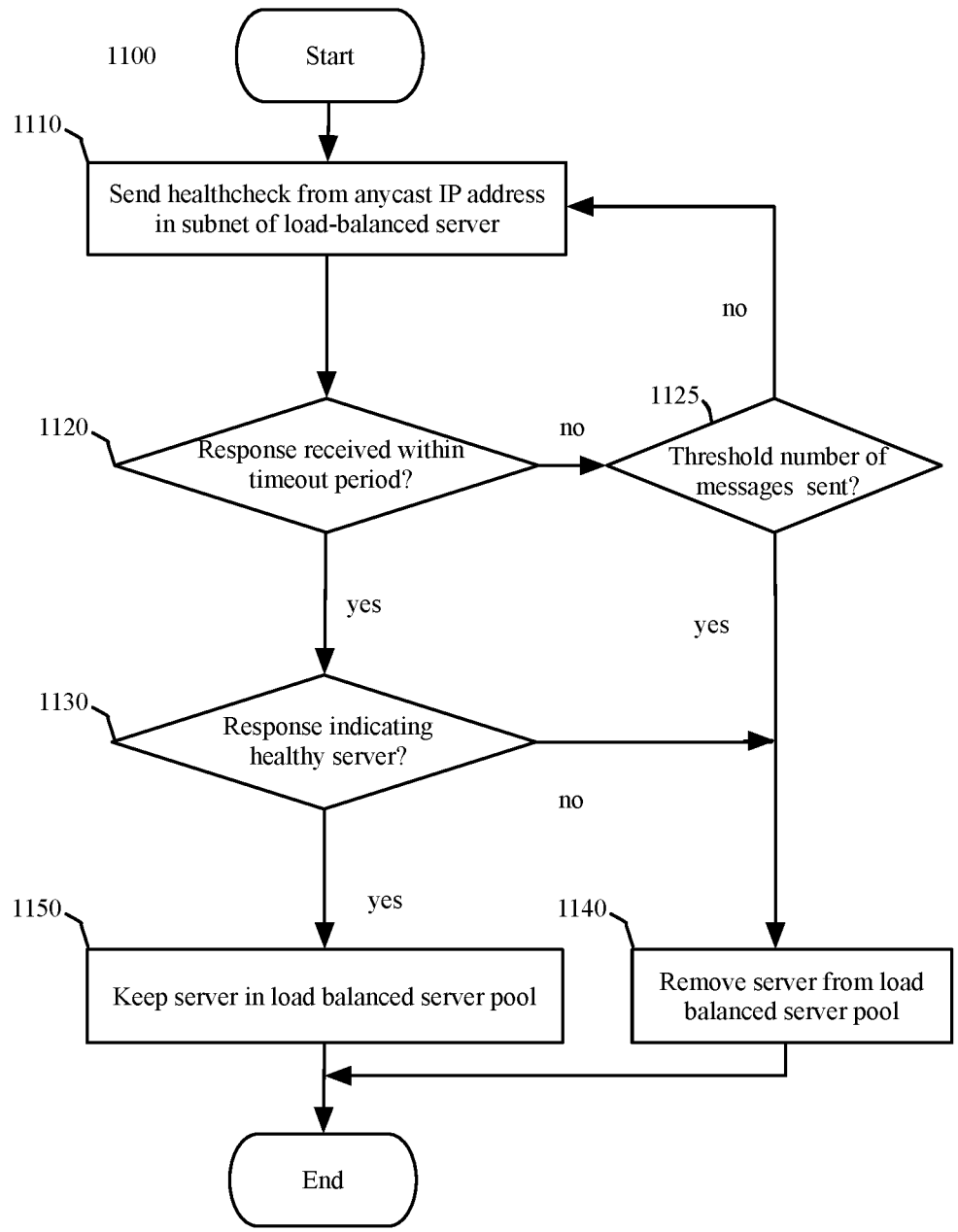
FIG. 11 conceptually illustrates a process and a logical data message flow of some embodiments for performing healthchecks on load-balanced servers.
Figure 12:
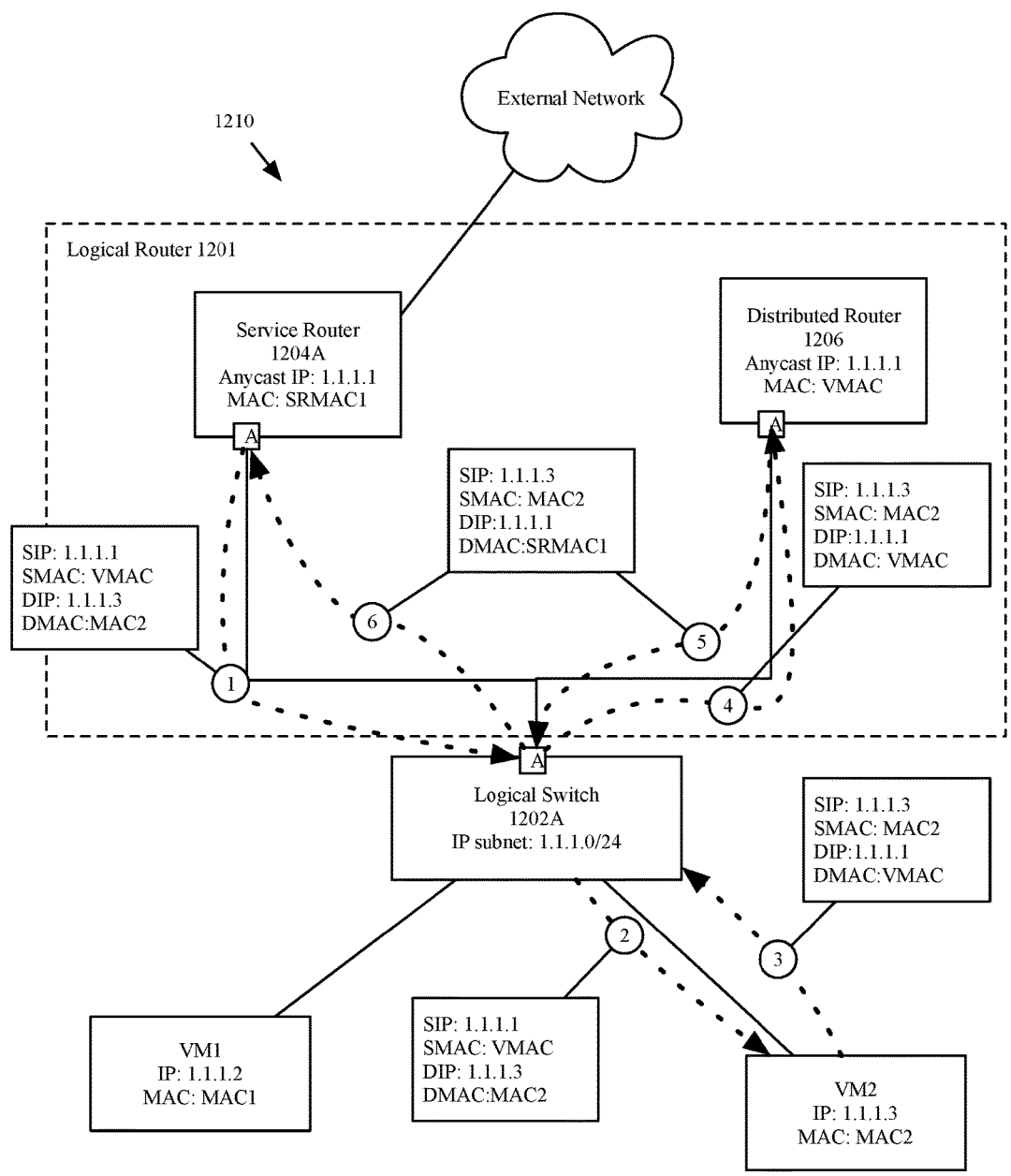
FIG. 12 conceptually illustrates a data message flow in the logical network for a healthcheck message.

In some embodiments, a service router providing a load balancing service for a set of DCNs (e.g., servers) of the logical network checks the state (e.g., performs a healthcheck operation) of the DCNs to ensure that messages are directed only to those DCNs that are functioning properly. FIG. 11 conceptually illustrates a process 1100 for performing a healthcheck (i.e., checking the state of the DCN) for a particular DCN. FIG. 12 conceptually illustrates an exemplary logical data message flow when carrying out the process of FIG. 11.

The process 1100 begins by sending (at 1110) a healthcheck message from the anycast source IP address that is associated with the subnet to which the DCN belongs (data message 1 in FIG. 12). In some embodiments, it is necessary to use the anycast IP address in the same subnet as the DCN because an IP address from another subnet (e.g., the subnet of a transit logical switch) would not be recognized as being a valid load balancer for the particular DCN. FIG. 12 illustrates logical switch 1202A forwarding the data message to VM2 (i.e., the DCN that is having its health checked) as data message 2. In other embodiments, the healthcheck message is sent using an anycast IP address for another subnet in the particular DCN's logical network. In some embodiments, healthcheck messages are sent out periodically, at set times, and/or upon the detection of other changes to a logical network.

The process then determines (at 1120) whether a response is received from the particular DCN (e.g., server) within a timeout period. If no response is received within a timeout period the process in some embodiments determines (at 1125) whether a threshold number of healthcheck messages have been sent. If the threshold number of healthcheck messages have not been sent, the process sends (at 1110) another healthcheck message. If the threshold has been met, the process removes (at 1140) the DCN from the load-balanced set of DCNs that receive load-balanced messages.

If the process receives a response to the healthcheck within the timeout period (as shown in data messages 3-6 of FIG. 12), the process (at 1130) determines if the healthcheck response indicates a healthy DCN (i.e., a DCN that can continue to receive load-balanced messages). In some embodiments, data messages 5 and 6 may be forwarded to the service router over the transit logical switch (not shown in FIG. 12) instead of over the logical switch over which it was received. If the process (at 1130) determines that the response did not indicate a healthy DCN, the DCN is removed (at 1140) from the set of DCNs to which load-balanced messages are directed and the process ends. However, if the process (at 1130) determines that the response indicates a healthy DCN, the process keeps (at 1150) the DCN in the set of DCNs to which load-balanced messages are directed and the process ends. One of ordinary skill in the art will appreciate that this method is performed for multiple DCNs in the set of DCNs that receive load-balanced messages.

Figure 13:
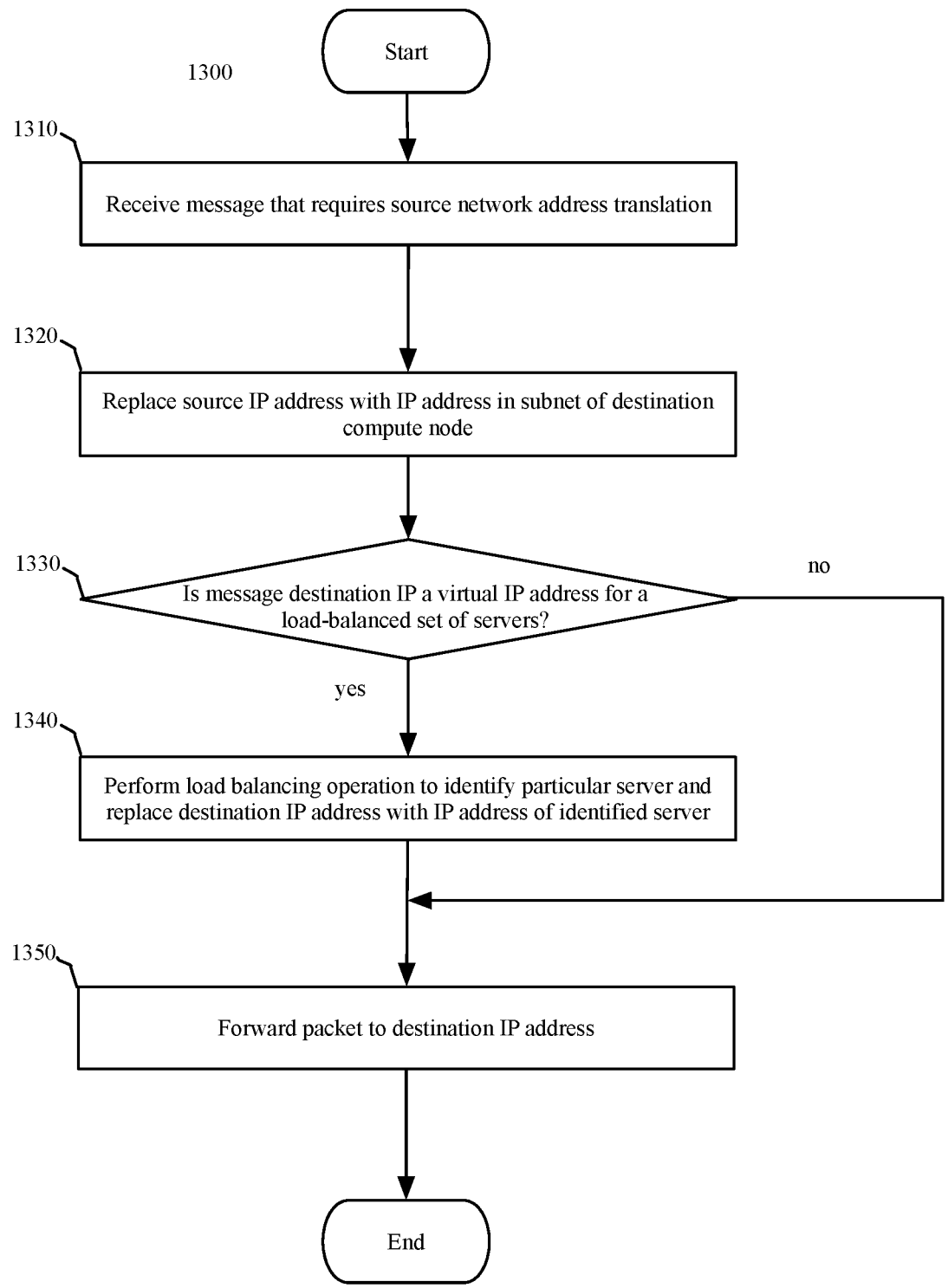
FIG. 13 conceptually illustrate a process of some embodiments for performing source network address translation and load balancing.
Figure 14A:
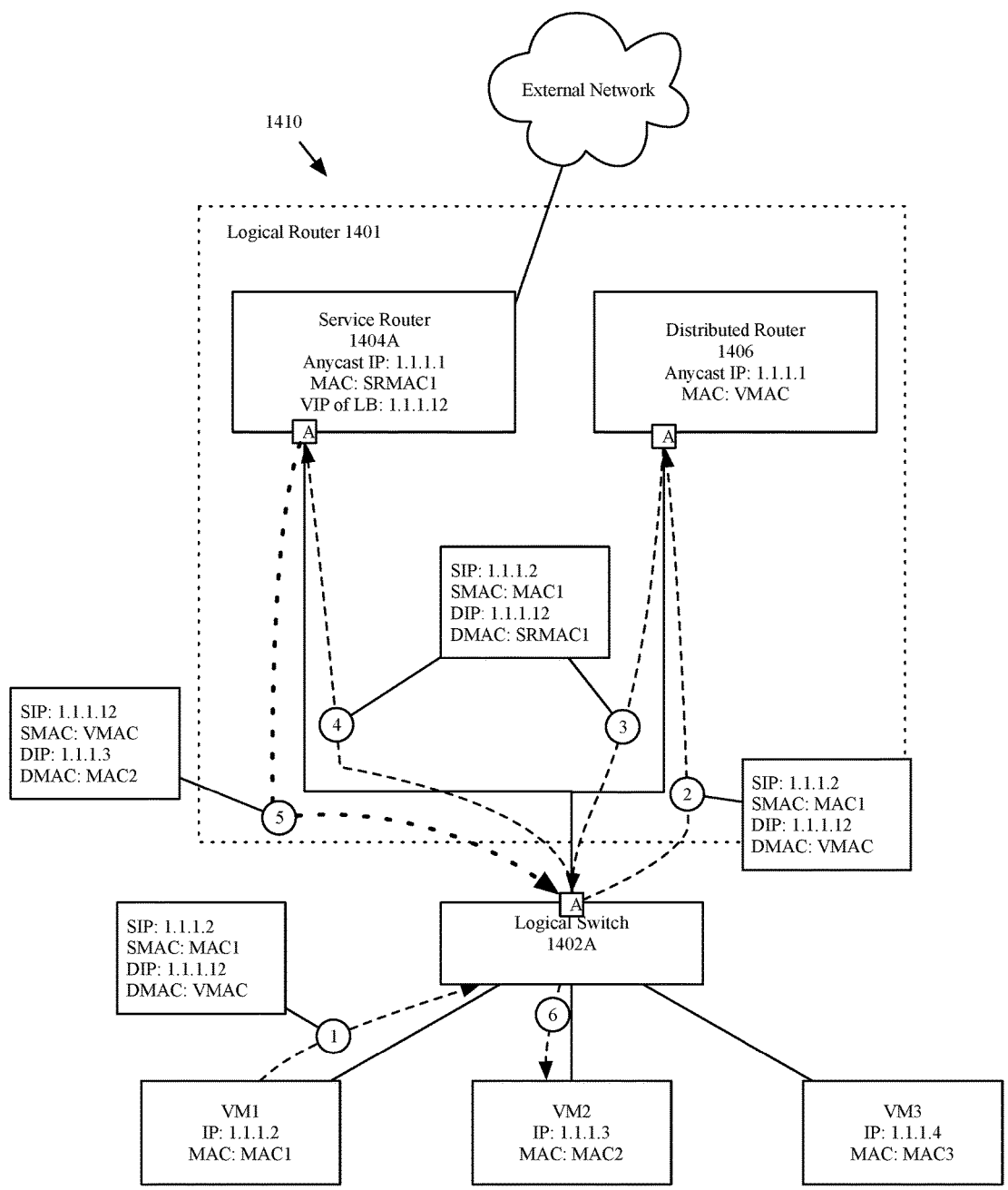
FIGS. 14A-B conceptually illustrate a logical data message flow of some embodiments for performing load balancing and source network address translation.
Figure 14B:
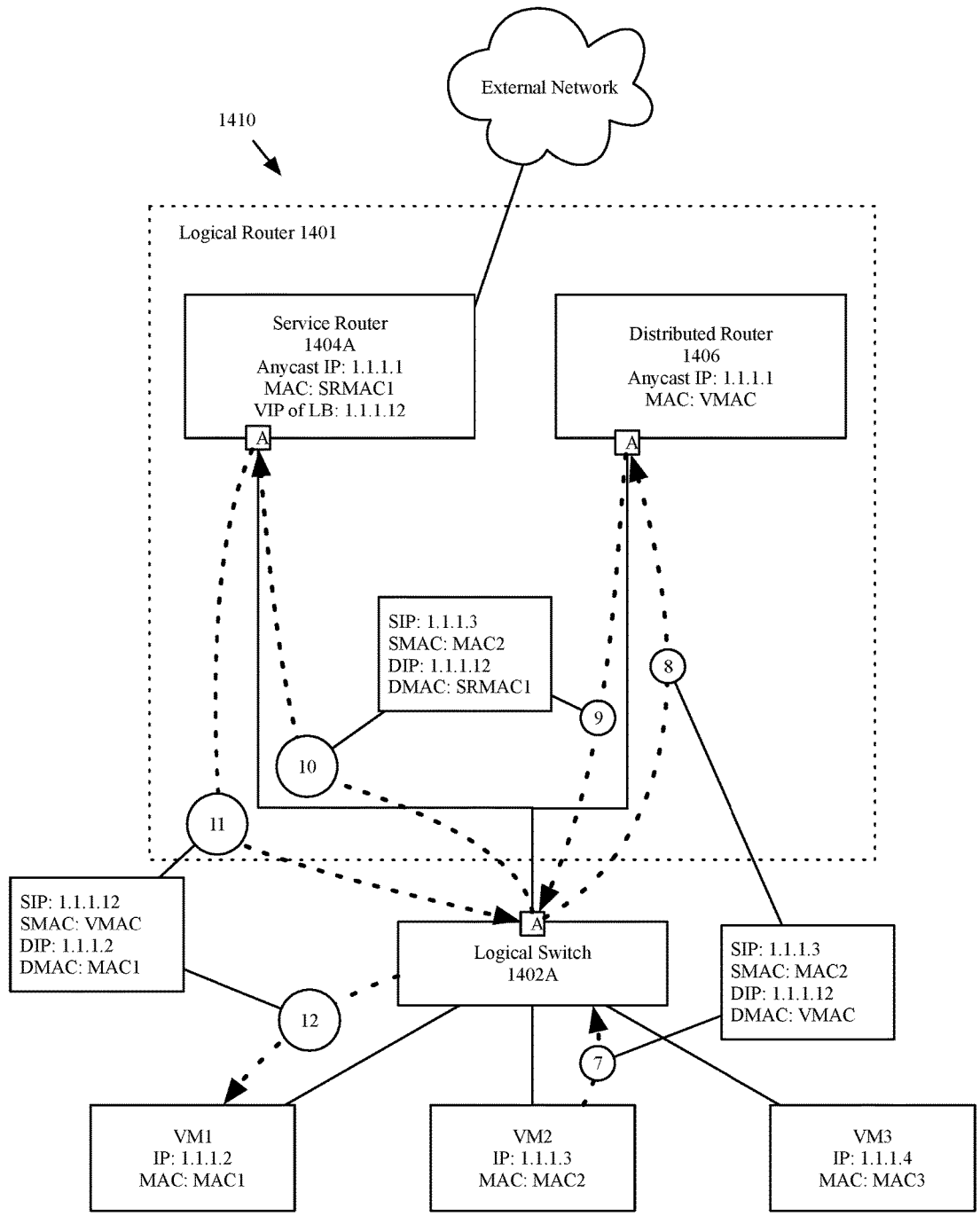

FIG. 13 conceptually illustrates a process 1300 for performing a network address translation (NAT) service. In some embodiments, process 1300 is performed by a service router. The network address translation in some embodiments is a source NAT (SNAT) that changes a source network address of a message from an original source network address to a different source network address of the forwarded message. A service router in some embodiments uses the anycast IP address as the translated address. SNAT for externally received data messages that translate the source address into the IP anycast address causes return data messages to be directed to the service router (either directly or through the distributed router), for the service router to route to the external destination. In some embodiments, process 1300 is performed as part of a load balancing service. FIGS. 14A-B conceptually illustrate a logical data message flow in an embodiment in which load balancing (for a set of DCNs addressed at a virtual IP address of 1.1.1.12) and SNAT are both performed by service router 1404A.

The process (at 1310) receives a data message that requires source network address translation. In some embodiments, the message is a message that is sent to a virtual IP address associated with a set of DCNs that acts as a server. Clients of the server are located in the logical network in some embodiments, while in others the clients are external to the logical network. In some embodiments, both internal and external clients use the VIP to address the set of DCNs. A client in some embodiments is on a same subnet as a load-balanced server DCN. FIG. 14A illustrates a client DCN (VM1) sending data message 1 to the VIP address 1.1.1.12 of the load balanced set of DCNs (including VM2 and VM3). In some embodiments, multiple load-balanced DCNs logically connect to the same logical switch. Multiple logical switches in some embodiments are logically connected to multiple load-balanced DCNs. Data message 2 is forwarded to distributed router 1406 which forwards the data message to service router 1404A. FIG. 14A depicts the data message being forwarded over logical switch 1402A from which it was received (data messages 3 and 4). In some embodiments, the data message is forwarded over the transit logical switch (not shown in FIGS. 14A-B). Data message 4 is received by service router 1404A to provide the load balancing service.

The process then replaces (at 1320) the source IP address of the received message with a different source IP address. In some embodiments, SNAT automap is configured to use an IP address in the same subnet as the DCN to which the data message is destined (as for data message 5). In other embodiments, a user explicitly configures an IP address to use in an SNAT process. The user-configured IP address in some embodiments is in a different subnet from a destination DCN, while in others it is in the same subnet as a destination DCN. In embodiments in which the SNAT is being provided for multiple DCNs in multiple subnets and the configured IP address is in the same subnet as at least one of the DCNs, there are other DCNs for which it is not in the same subnet.

For embodiments in which a translated source IP address is in a same subnet as a load-balanced DCN other logical structures, as opposed to the structure described above, would not allow for the translated address to be resolved by the load-balanced DCNs in the same subnet without being dropped. If, for example, a service router was not connected to the logical switch for the translated address' subnet, a DCN receiving messages using the translated address would send an ARP message (request) for the IP address in its subnet, but since the service router was not connected to the logical switch and would therefore not receive the ARP message, it would never respond to the ARP request and the message would be dropped. While a distributed router could be programmed to function as an ARP proxy for addresses used in the SNAT operation, in the embodiments described above, the service router is connected to the logical switch and would receive the ARP message directly and respond on its own behalf.

The process (at 1330) determines if the process is directed to a virtual IP address for a load balanced set of DCNs. For messages (such as data message 4 of FIG. 14A) that are directed to a virtual IP address of a load balanced set of DCNs, the process performs (at 1340) a load balancing operation to select one of the load-balanced DCNs (e.g., at least VM 2 and VM3 of FIGS. 14A-B) and replaces the destination address in an additional destination NAT (DNAT) operation to change the destination network address from the virtual IP address to an IP address of the identified DCN to which the message is directed according to a load balancing criteria (as for data message 5 of FIG. 14A). The process then forwards (at 1350) the message to the translated destination IP address and ends.

If the process determines (at 1330) that the destination IP address is not a virtual IP address, the process forwards (at 1350) the message to the destination (depicted as data message 6) and the process ends.

FIG. 14B also illustrates the return path and reverse SNAT for data messages 7-12. The server DCN sends data message 7 back to service router 1404A using the VIP address and the anycast (virtual) MAC (VMAC) address. Data message 8 represents the data message being logically forwarded to distributed router 1406 which would then logically process the data message and replace the VMAC with SRMAC1 and send it out over logical switch 1402A as data message 9 (in other embodiments, or configurations of the distributed router, the data message is forwarded over the transit logical switch which is not shown in FIG. 14B). Data message 10 with destination MAC address SRMAC1 is sent to service router 1404A which performs the reverse SNAT and forwards the data message to the client DCN (VM1) as data message 11 using the VIP as the source IP and the anycast (virtual) MAC address as the source MAC address. Data message 12 is then received by the client DCN.

The data message flows depicted in FIGS. 14A-B illustrate the use of a service router that is connected to a logical switch for a particular subnet to allow a "one-arm" load balancing in which a client and load-balanced server are both on a same subnet. If, on the other hand, a service router providing a load balancing service for a set of server DCNs in a first subnet did not perform SNAT, a server DCN would reply to the message directly to a client DCN in the same subnet using the IP address of the client DCN, the reply would arrive at the client DCN, but the client would not recognize the source of the reply because it would have originally sent the message to the virtual IP address not the IP address of the server DCN. Additionally, if the SNAT used an IP address in the same subnet, but was not connected to the logical switch and the server DCN attempted to resolve the IP address using a broadcast over the logical switch the owner of the IP address (e.g., the service router providing the load balancing service) would not receive the address resolution message because it was not associated with (or connected to) the logical switch over which the address resolution message was sent. If the distributed router that received the ARP message was not programmed to function as an ARP proxy for the translated addresses, the message would be left unresolved and no return messages could be sent by the server DCN.

Figure 15:
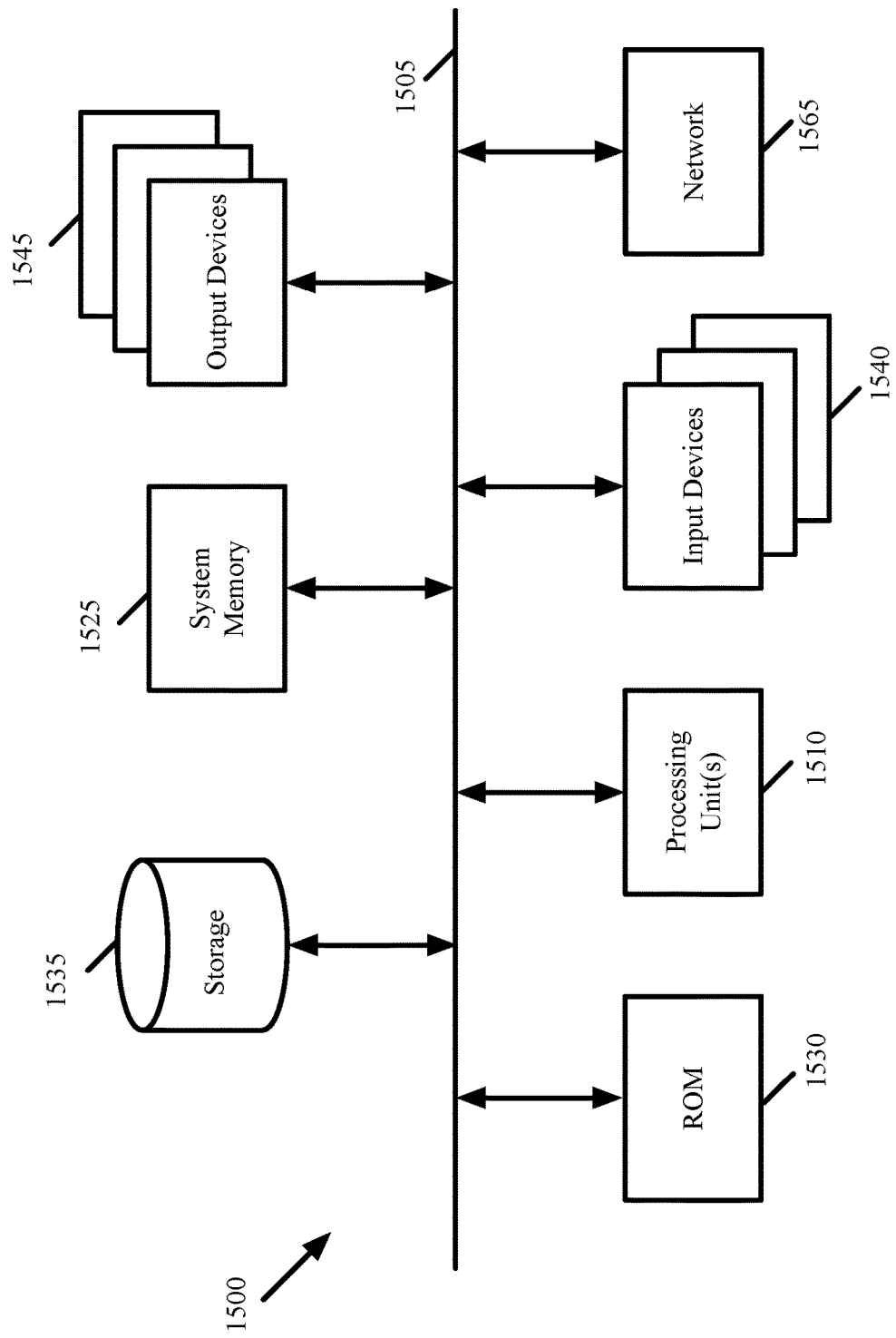
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such as random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 6, 7, 11, and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:
1. A method comprising:
 receiving, at a first host implementing (1) a distributed logical router and (2) a plurality of logical switches of a logical network along with other hosts, a message from a first data compute node (DCN) executing on the first host;

logically forwarding the message to the distributed logical router that uses a particular anycast internet protocol (IP) address using a first media access control (MAC) address;

determining that the message requires processing by a centralized logical router executing on an edge node host; and forwarding the message to the centralized logical router that uses the same anycast IP address using a second, unique MAC address.

2. The method of claim 1, wherein the determination that the message requires processing by a centralized logical router is based on a destination IP address of the data message that is not in the logical network.

3. The method of claim 1, wherein the determination that the message requires processing by a centralized logical router is based on a determination that the data message requires a network service provided by the centralized logical router.

4. The method of claim 1, wherein forwarding the message to the centralized logical router comprises determining a logical switch over which to forward the message.

5. The method of claim 4, wherein the determination of a logical switch over which to forward the message is based on a policy-based routing policy configured on the distributed logical router.

6. The method of claim 4, wherein the determination of a logical switch over which to forward the message is based on a host route configured on the distributed logical router.

7. The method of claim 4, wherein, based on the determination, the message is forwarded over a particular logical switch implemented by the first host and the edge node host, the particular logical switch not connected to DCNs.

8. The method of claim 4, wherein, based on the determination, the message is forwarded over a particular logical switch over which the original message was received from the DCN.

9. The method of claim 1, wherein the centralized logical router provides a load balancing service for a set of server DCNs in at least a first subnet of the logical network.

10. The method of claim 9, wherein providing the load balancing service comprises sending healthcheck messages to the set of load balanced server DCNs using a source IP address in the first subnet.

11. The method of claim 9, wherein the set of load balanced server DCNs are addressed by a virtual IP address that is in the first subnet.

12. The method of claim 9, wherein the load balancing service is configured to perform network address translation for incoming traffic using an IP address in the same subnet as a destination server DCN.

13. The method of claim 9,
wherein a set of centralized logical routers in the plurality of centralized logical routers are active centralized logical routers, and
wherein the unique MAC addresses of the set of active centralized logical routers are provided to the first host as configuration data, the set of unique MAC addresses of the active service routers being used to forward messages from the distributed router to the set of centralized logical routers.

14. The method of claim 1,
wherein the centralized logical router is a first centralized logical router in a plurality of centralized logical routers executing on a plurality of hosts, and
wherein each centralized logical router has a unique MAC address and is addressable by the anycast IP address.

15. A non-transitory machine readable medium storing a program for execution by a set of processors, the program comprising sets of instructions for:

receiving, at a first host implementing (1) a distributed logical router and (2) a plurality of logical switches of a logical network along with other hosts, a message from a first data compute node (DCN) executing on the first host;

logically forwarding the message to the distributed logical router that uses a particular anycast internet protocol (IP) address using a first media access control (MAC) address;

determining that the message requires processing by a centralized logical router executing on an edge node host; and forwarding the message to the centralized logical router that uses the same anycast IP address using a second, unique MAC address.

16. The non-transitory machine readable medium of claim 15, wherein the determination that the message requires processing by a centralized logical router is based on a destination IP address of the data message that is not in the logical network.

17. The non-transitory machine readable medium of claim 15, wherein the determination that the message requires processing by a centralized logical router is based on a determination that the data message requires a network service provided by the centralized logical router.

18. The non-transitory machine readable medium of claim 15, wherein the centralized logical router provides a load balancing service for a set of server DCNs in at least a first subnet of the logical network.

19. The non-transitory machine readable medium of claim 18, wherein providing the load balancing service comprises sending healthcheck messages to the set of load balanced server DCNs using a source IP address in the first subnet.

20. The non-transitory machine readable medium of claim 18,
wherein the set of load balanced server DCNs are addressed by a virtual IP address that is in the first subnet, and
wherein the load balancing service is configured to perform network address translation for incoming traffic using an IP address in the same subnet as a destination server DCN.

* * * * *